United States Patent [19]
Blezard

[11] Patent Number: 5,092,414
[45] Date of Patent: Mar. 3, 1992

[54] STRAIGHT LINE FILL-TO-WEIGHT MACHINE

[75] Inventor: Robert C. Blezard, Harwich Port, Mass.

[73] Assignee: Charles Packaging Corporation, Lincoln, R.I.

[21] Appl. No.: 650,939

[22] Filed: Feb. 4, 1991

Related U.S. Application Data

[62] Division of Ser. No. 433,499, Nov. 8, 1989, Pat. No. 5,004,093.

[51] Int. Cl.[5] .................... G01G 13/00; G01G 19/00; B65B 1/32; B65B 43/42
[52] U.S. Cl. ..................... 177/52; 177/145; 141/83; 141/129
[58] Field of Search ................... 177/52–54, 177/145; 141/83, 129

[56] References Cited

U.S. PATENT DOCUMENTS

| | | |
|---|---|---|
| 1,346,613 | 7/1920 | Taliaferro et al. |
| 2,247,401 | 7/1941 | Papendick |
| 2,404,232 | 7/1946 | Hunter |
| 2,967,703 | 1/1961 | Jones |
| 3,123,956 | 3/1964 | Fisher |
| 3,198,271 | 8/1965 | Good |
| 3,219,132 | 11/1965 | Nowak, Jr. .......................... 177/145 |
| 3,263,759 | 8/1966 | Arvidson et al. |
| 3,308,922 | 3/1967 | Ellis et al. |
| 3,322,167 | 5/1967 | Rosen |
| 3,462,911 | 8/1969 | Schmidt |
| 3,693,737 | 9/1972 | Young et al. |
| 4,010,594 | 3/1977 | Boyd ................................. 177/52 |
| 4,339,028 | 7/1982 | Meacle |
| 4,428,179 | 1/1984 | Jordan et al. |
| 4,442,910 | 4/1984 | Mikami |
| 4,548,286 | 10/1985 | Sashiki et al. |
| 4,848,479 | 7/1989 | Schaltegger ..................... 177/145 |

FOREIGN PATENT DOCUMENTS

| | | |
|---|---|---|
| 2733823 | 2/1979 | Fed. Rep. of Germany |
| 2446785 | 9/1980 | France |
| 0111315 | 8/1980 | Japan |
| 0916818 | 1/1963 | United Kingdom |
| 2138791 | 10/1984 | United Kingdom |

Primary Examiner—George H. Miller, Jr.
Attorney, Agent, or Firm—Edward D. C. Bartlett

[57] ABSTRACT

A machine having multiple stationary weighing and filling platforms serviced by parallel straight line infeed and discharge container or material conveyors. Positive grippers transfer the containers or other material to be weighed transversely to stationary weighing and filling platform and the same or similar grippers transfer the containers from the platform to a parallel discharge track. This eliminates centrifugal forces, increased throughput reduces floor space and permits greater sensitivity in weighing since there is no inherent motion of vibration at the weighing station.

14 Claims, 6 Drawing Sheets

STRAIGHT LINE FILL-TO-WEIGHT MACHINE

CROSS REFERENCE TO RELATED APPLICATION

This application is a division of copending patent Ser. No. 433,499 filed Nov. 8, 1989 now U.S. Pat. No. 5,004,093.

BACKGROUND OF THE INVENTION

Heretofore, in order to maintain a relatively high speed, the containers were moved along a circular track or transferred by a pivoted arm to filling and weighing stations or positions. While high speeds have been achieved with such arrangements, filling accuracy is reduced by the vibration and movement of the containers during filling. Moreover, centrifugal forces limit the usefulness and speed of such a device, particularly where the container is fragile, such as a glass or earthenware container. Sloshing or spilling from centrifugal forces further limits the speed of such machines.

Reference is made to the following patents:

| Inventor | Patent | Dated |
|---|---|---|
| Salmonsen et al | 4,344,493 | 8/82 |
| Patzwahl | 4,514,953 | 5/85 |
| Tisma | 4,578,929 | 4/86 |
| Schaltegger | 4,625,775 | 12/86 |
| Schaltegger | 4,657,054 | 4/87 |
| Schaltegger | 4,848,479 | 7/89 |

The patent to Schaltegger '479 is owned and subject to assignment to the same person or entity as this application. The other patents are cited in Schaltegger.

OBJECTS OF THE INVENTION

It is an object of the invention to provide an improved filling and weighing machine where containers are moved in a straight line so as to eliminate centrifugal forces. Further, it is desired that the containers be positively gripped for transfer to a weighing and filling platform that is stationary to improve the accuracy of the filling and weighing.

It is desired to feed a plurality of containers in a straight line procession parallel to a linearly arranged group of stationary filling and weighing platforms, to positively grip and transfer such containers laterally (diagonally) to the platforms and finally to a discharge conveyor travelling in a direction that will generally be parallel but may be perpendicular to the group of platforms.

An object of the invention is to completely isolate the stationary scales from the moving parts of the machine to eliminate weighing fluctuations due to inherent vibrations and other mechanical disturbances.

An object of the invention is to employ stationary filling heads so that maintenance or replacement of parts such as a feed nozzle can be performed during the operation of the machine to reduce down-time.

A further object of the invention is to reduce the actual travel speed of the containers as they approach the filling and weighing platform while maintaining a high throughput. As those skilled in the art will understand relatively slower velocity of the container reduces breakage in frangible containers and reduces spillage due to tilting or rocking of containers.

An important object of the invention is to eliminate under-filling of containers by controlling the filling from a stationary weighing device. It is an object of the invention to limit the pre-established over-fill only by the accuracy and specifications of the weighing device and filling head by eliminating errors due to vibration or movement of containers during weighing and filling and further by providing for a momentary dwell in the movement of the container at a weighing station.

A further important object of the invention is to reduce the number of moving parts. Reductions of over eighty percent of moving parts over conventional fillers have been made possible by stationary filling and weighing mechanisms served by the straight line conveyors in accordance with this invention.

The invention eliminates costly and complex epicycloidal and planetary gearing.

A further object of the invention is to provide true weight for each individual container rather than an average rate spread over a large number of containers.

Another advantage of the present design is that it is compatible with expansion for future increased capacity.

A prime object of the invention is to increase throughput at lower container velocity or conversely to reduce container velocity while maintaining high throughput. Movement along straight paths also permits actual higher container velocity than does circular or curved movement on an arc with concurrent centrifugal forces.

I have further found that my invention reduces floor space for the same throughput over the circular or rotary devices. Increased speed requires in a rotary machine an increased radius of the circular path to reduce the centrifugal forces and to accommodate a larger number of containers in the filling path. It is accordingly an object of this invention to permit higher speeds in a weighing and filling machine while at the same time conserving floor space. It is therefore an object of my invention to conserve floor space while increasing throughput and to handle containers in a more gentle fashion by eliminating harmful centrifugal forces.

It is an object of the invention to fill a container while it is held in a stationary position. This is particularly important with comminuted materials since they can be vibrated for compaction during the filling operation without increasing the risk of spillage by adding the forces of vibration to centrifugal force. Elimination of centrifugal forces are also important where the material is a liquid that will slosh and spill under the influence of centrifugal forces.

It is an object of the invention to feed parallel input conveyors which are subdivided a number of times to halve or more than halve their velocity during each division. I have found that for a container of four inch diameter such as a coffee can, a machine filling four hundred coffee cans per minute occupies less floor space and runs at substantially lowered velocities than a machine of similar capacity employing rotary or circular paths for filling.

I have further found that my machine can fill with greater accuracy since the stationary platform is inherently less susceptible to error and it is possible to fill to measure each container because of the increased accuracy. The normal variation (little sigma) is greatly reduced. Thus predetermined overfilling may be greatly reduced or entirely eliminated while complying with weight regulations.

DETAILED DESCRIPTION OF THE PREFERRED EMBODIMENT

Figure 1:
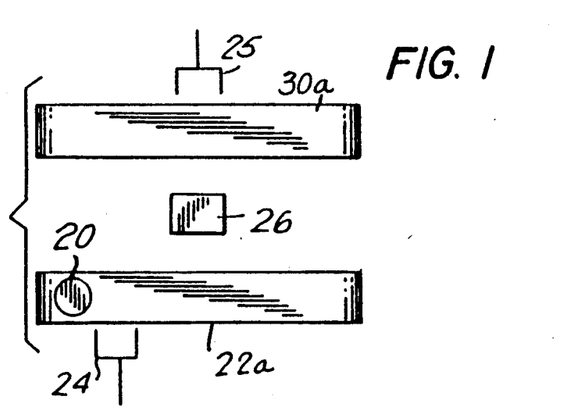
FIGS. 1-5 schematically illustrate the movement of a single container on the incoming track, its transfer to the filling weighing station and subsequent transfer to the discharge track.
Figure 2:
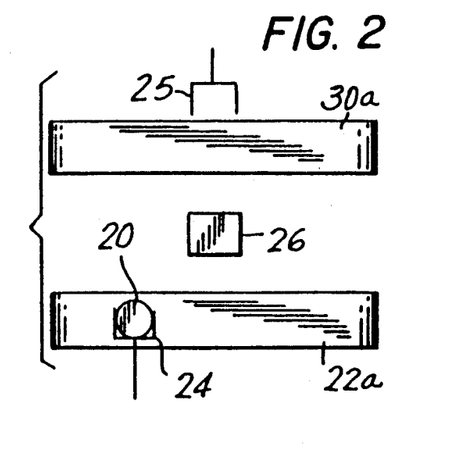
Figure 3:
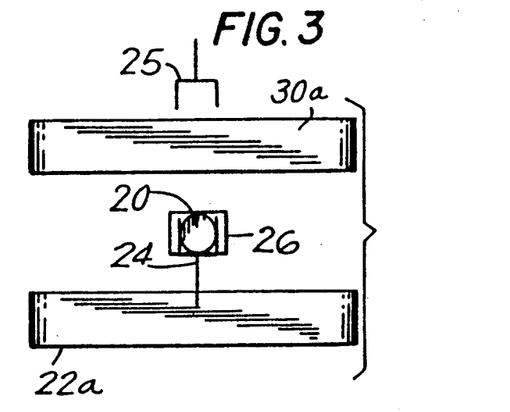
Figure 4:
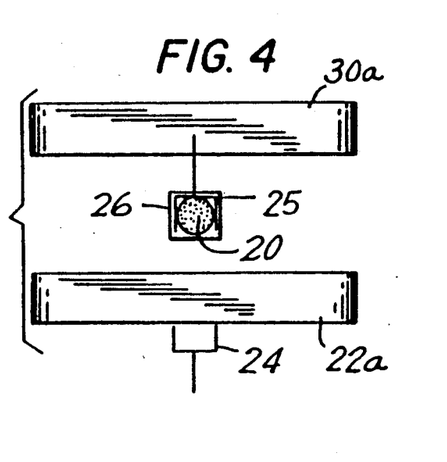
Figure 5:
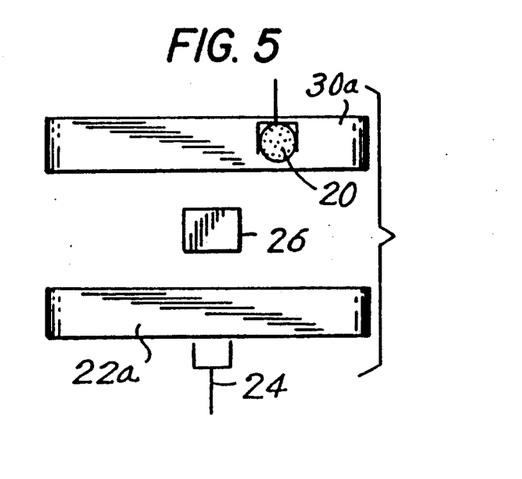

Referring to FIGS. 1-5, there is shown schematically a container 20 on the final, slowest moving incoming conveyor 22a (FIG. 1). The gripper 24 removes container 20 and deposits it on the filling and weighing platform 26 (FIGS. 2 and 3). The gripper 25 removes the weighed and filled container 20 from platform 26 to discharge conveyor 30a (FIGS. 4 and 5).

Figure 7:
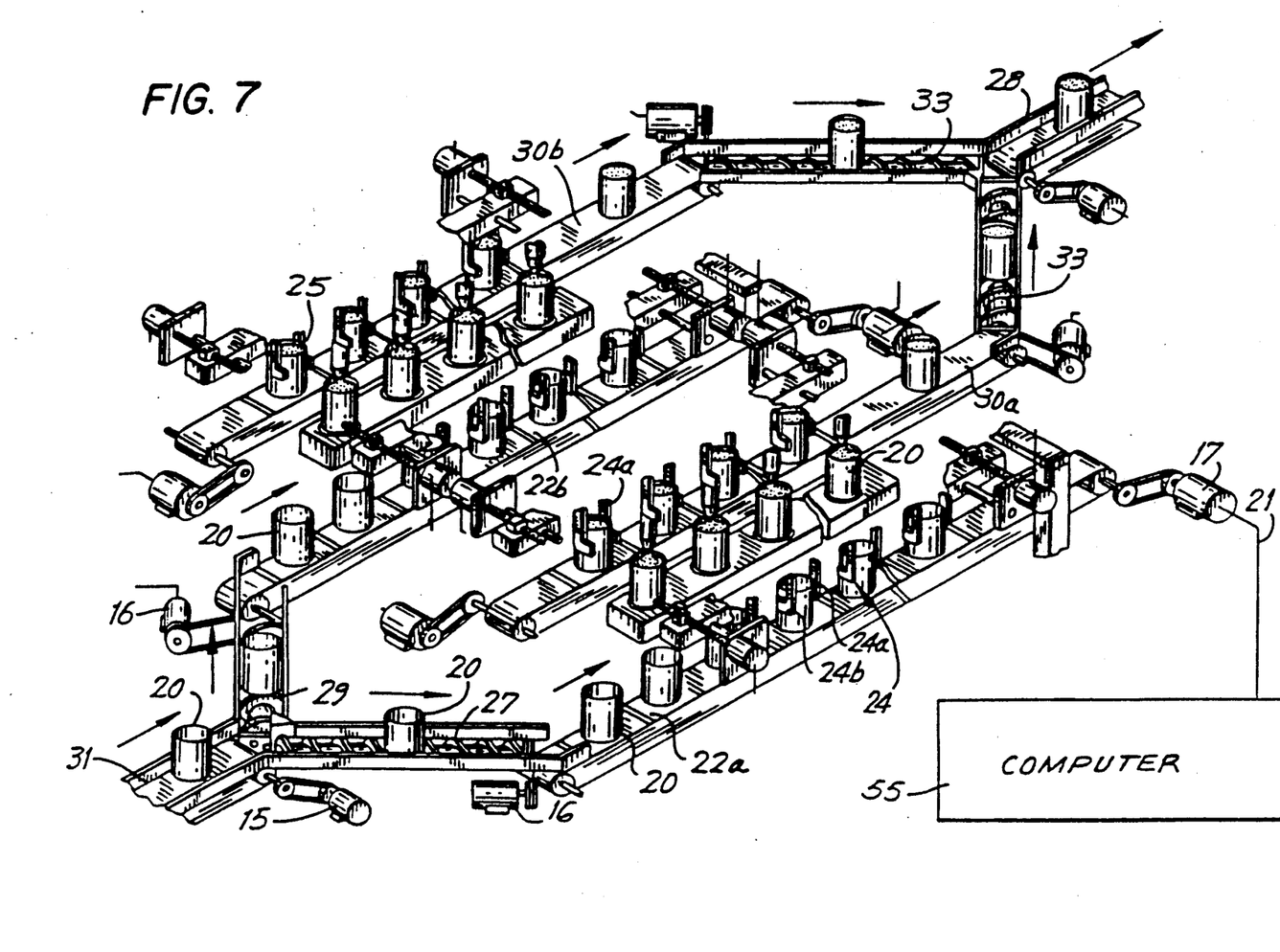
FIG. 7 shows two of a plurality of filling and weighing platforms with input and discharge conveyors and means for slowing and speeding the containers before and after filling, respectively.

Referring now to FIG. 7, there is shown a straight line feed conveyor 31 on which containers 20 are alternately separated by worm screw conveyors 27, 29 to proceed to input conveyors 22a, 22b, respectively. Conveyors 22a and 22b may run at half (or less) the linear speed of conveyor 31. Optionally, conveyors 22a and 22b may be intermittently driven.

Synchronous motors 15, 16 and 17 drive conveyors 31, 27 and 22a respectively. The speed of these motors may be programmed by a computer 55 connected by cables such as 21 shown to motor 17.

Discharge conveyors 30a, 30b receive containers transferred by grippers 25. Containers on discharge conveyors 30a and 30b are merged by transfer worms 33 onto discharge conveyor 28. Discharge conveyors 30a and 30b optionally may be driven intermittently.

Figure 6:
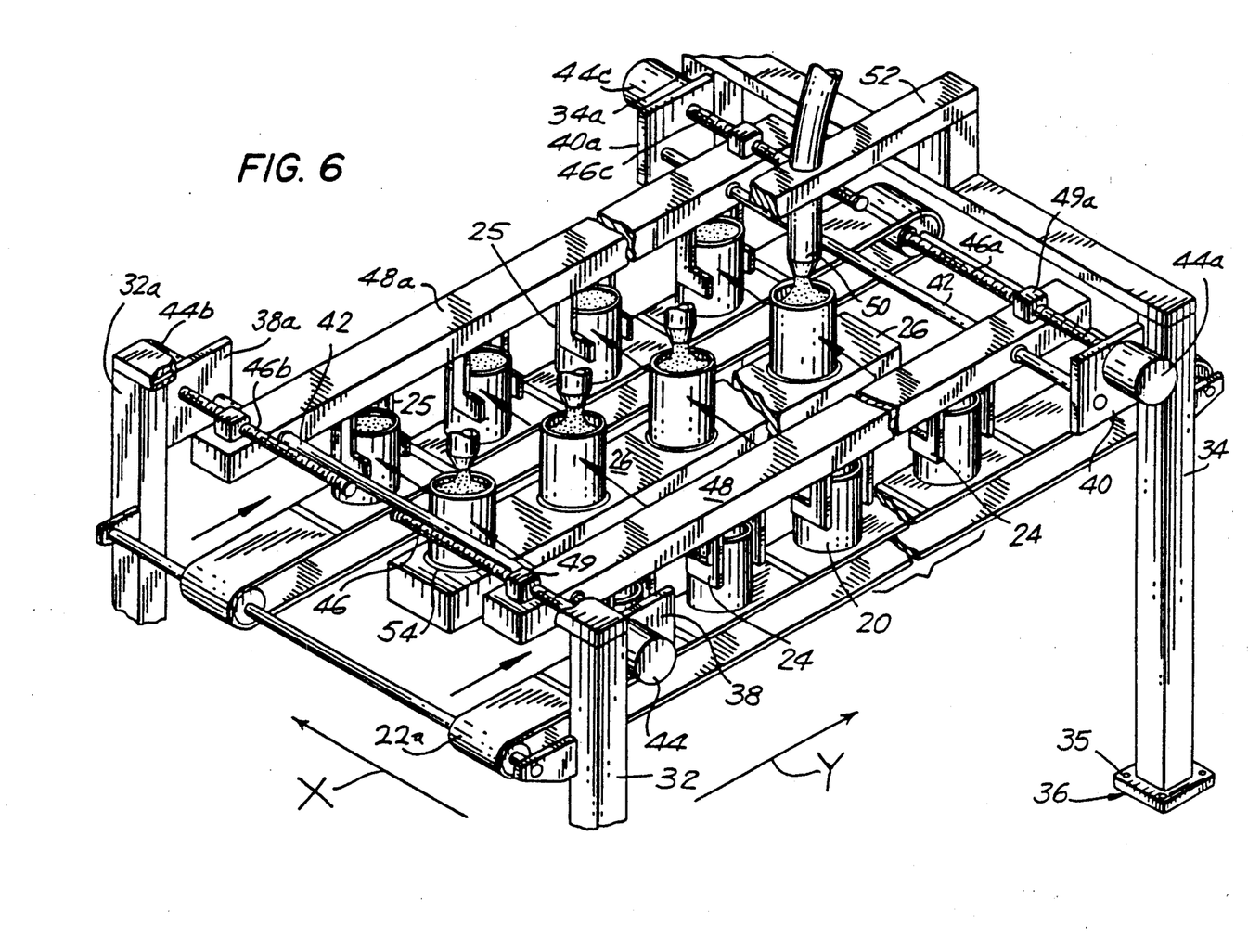
FIG. 6 shows movement of gripper heads to and from the weighing/filling stations and input and discharge conveyors.

Referring more specifically to FIG. 6, the grippers 24 positively grip the container 20, transfer it to a filling and weighing station 54 on frame or platform 26. Platform 26 is supported by posts (not shown) embedded preferably in the ground or floor of the building to avoid vibration. That is, the weighing platform 26 is sequestered from the driving, moving and conveying parts of the machine to eliminate vibration inherent in those parts.

Posts 32, 32a, 34 and 34a are mounted on the plant floor or bed 35 of machine 36. The mounting and bearing plates 38, 38a, 40 and 40a are secured to posts 32, 32a, 34 and 34a, respectively. Support shafts 42 are mounted respectively in plates 38 and 40 at their one end and plates 38a and 40a at their other end. A cross-feed beam or head 48 is slidably mounted on shafts 42. Two-way synchronized electric motors 44, 44a are mounted on plates 38, 40 driving jack screws 46, 46a engaging a female thread in a bore formed in bosses 49, 49a respectively secured on head 48 to drivingly reciprocate head 48 along shafts 42. One motor 44 and associate drive may in many instances suffice but plural drives provide smoother action and eliminate any tendency to bind. Rotation of the two-way synchronized motors 44, 44a move the cross-feed head 48 carrying gripping mechanisms 24 to and fro on the X-axis normal between conveyor 22a and weighing and filling platform 26. The filling nozzles 50 mounted on stationary filling head 52 are activated by micro-switches or the like (not shown) controlled by scales 54 in a manner well known in the art. The particular weighing device 54 and filling mechanism 50 may be of any suitable type.

It should be understood that the length of cross feed beam 48, the number of grippers 24 and stations 54 is a matter of choice. However, the larger the number of grippers 24 and stations 54, the slower the transfer speeds may be for a given throughput, or conversely a higher throughput for the same transfer speed. The same principle applies to increasing the number of speed changes by further divisions of the input and discharge conveyors than shown. I have shown such divisions as bifurcations, but a triple or higher number of divisions is within the spirit of my invention.

Still referring to FIG. 6, there is shown a cross beam 48a also slidably mounted on support shafts 42. Motors 44b and 44c are secured to plates 38a and 40a respectively. The motors 44b and 44c drive jackscrews 46b and 46c, respectively, secured on head 48a to drivingly reciprocate head 48a along shafts 42.

In FIG. 7 only one subdivision of an input conveyor 31 is shown, but in a preferred arrangement a plurality of input conveyors 31 are employed. Said conveyors 31 would in turn be supplied from faster moving conveyors, each, for example, communicating with and supplying a pair of conveyors 31 and so on. An equal number of conveyors 28 receive and accelerate the discharge of filled and weighed containers to a final faster conveyor (not shown). In one embodiment of the invention I employ a 2:1 reduction between conveyors 31 and 22a, 22b and 1:2 increase from 30a (30b) to 28. That is, the relative velocity of a single conveyor 31 (28) to its communicating pair 22a, 22b, (30a, 30b) would be faster and suitably 2:1.

Figure 8:
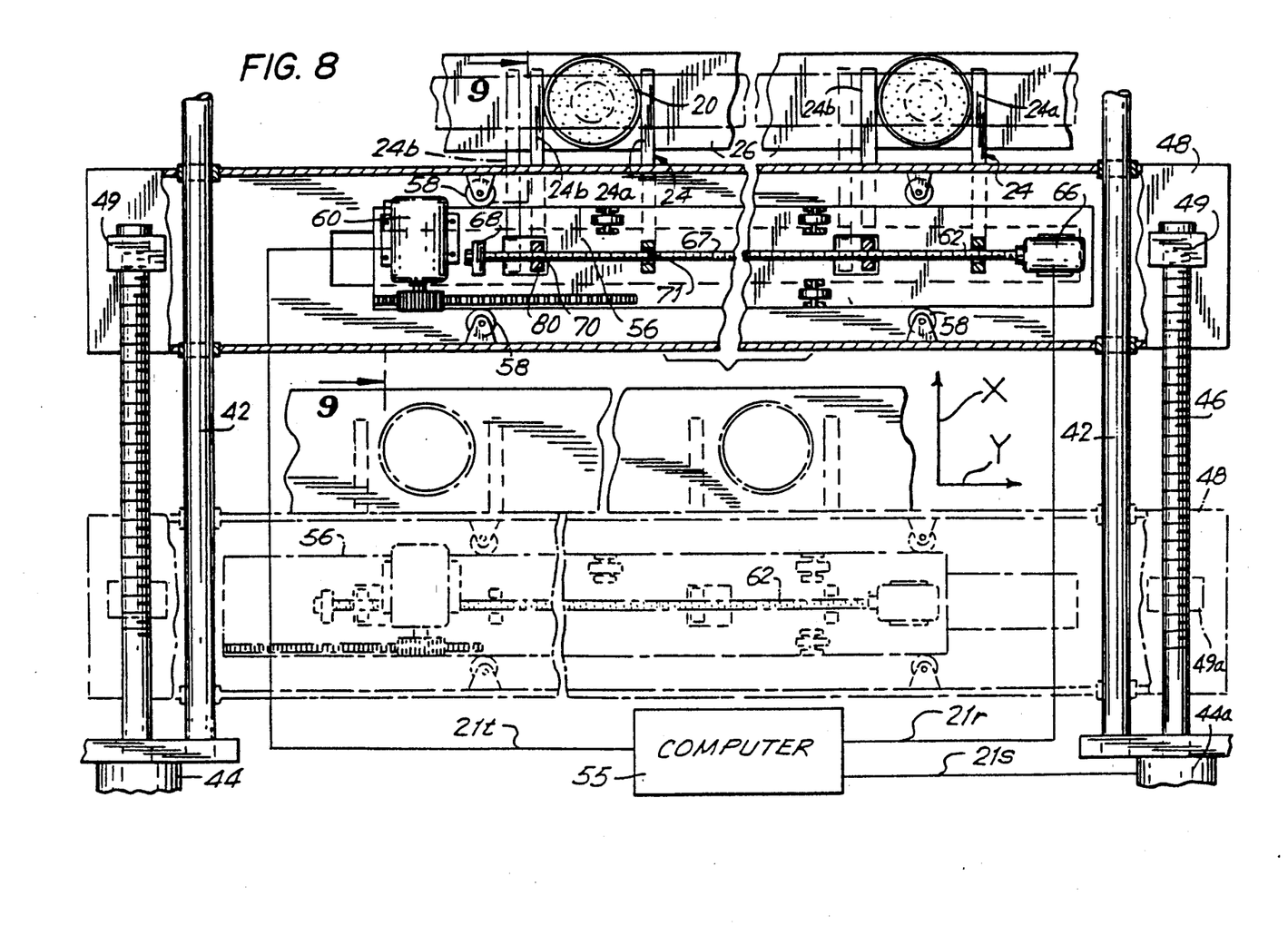
FIG. 8 shows in greater detail the mechanism for moving and operating the grippers.
Figure 9:
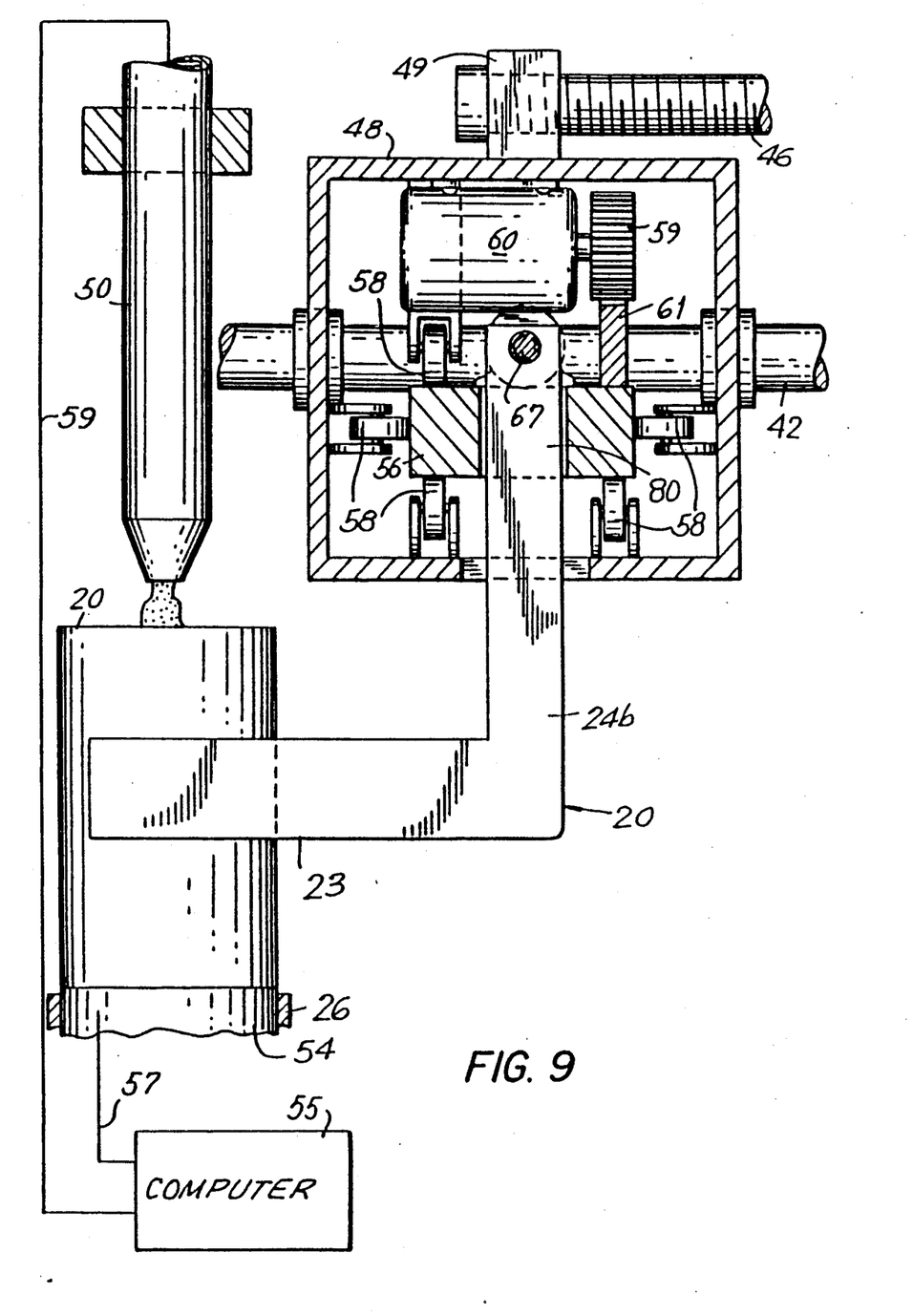
FIG. 9 is a sectional elevation taken on the line 9—9 of FIG. 8.

Referring to FIGS. 8 and 9, a more detailed illustration of beam 48 is shown. The grippers 24 have, of course, a pincer action and, in addition, they have two component gross movements; one along the X axis with beam 48 in a direction normal to the input conveyor, and the other along beam 48 on a Y axis with channel 56 in a Y direction parallel to the direction of the input and output conveyors (22a, 30a). The actual path of the grippers is the predetermined resultant of the two programmed motions or component vectors along the X and Y axes.

The beam 48 slidingly supports the channel 56 by means of the rollers 58. A synchronous two-way motor 60, mounted inside the beam 48, drives a gear 59 engaging a rack 61 (see FIG. 9) on channel 56 to slide channel 56 along beam 48 on rollers 58.

A synchronous motor 66 is mounted in one end of channel 56. The motor drives a jackscrew 67 revolvably supported at the other end of the channel in a bearing block 68. The pincers 24a are the leading pincers in each pair of grippers 24 with respect to the motion of the channel 56 along a conveyor 22a in the direction of movement of the conveyor. The trailing pincer 24b is movable with respect to 24a as is shown in the dash-dot line position in the upper portion of FIG. 8. The pincer 24b has a female threaded bore 70 engaging the threaded shaft 62. Pincer 24a has a non-threaded bore 71 revolvable about the threaded shaft 62. In this way, rotation of the two-way synchronous motor 66 reciprocates only the pincer 24b with respect to the pincer 24a of each pair of pincers 24.

In FIG. 8 is shown in phantom dotted lines the relative movement of the channel 56 and all of its associated parts including the grippers 24 and the container 20, also shown in phantom.

As more clearly seen in FIG. 6, the synchronous motors 44, 44a move the beam 48 back and forth on shafts 42 along the X axis. FIG. 9 shows the extension 23 of the grippers 24 so that the beam 48 will not interfere with the filler nozzle 50 shown filling a container 20 on the scale or balance 54 during the dwell in which the grippers 24 are in a slightly opened position. The scale 54 is connected to programmable computer 55 which controls the filler nozzle 50 by means of conductor wires generally indicated at 57 and 59, all in a well known manner.

Figure 10:
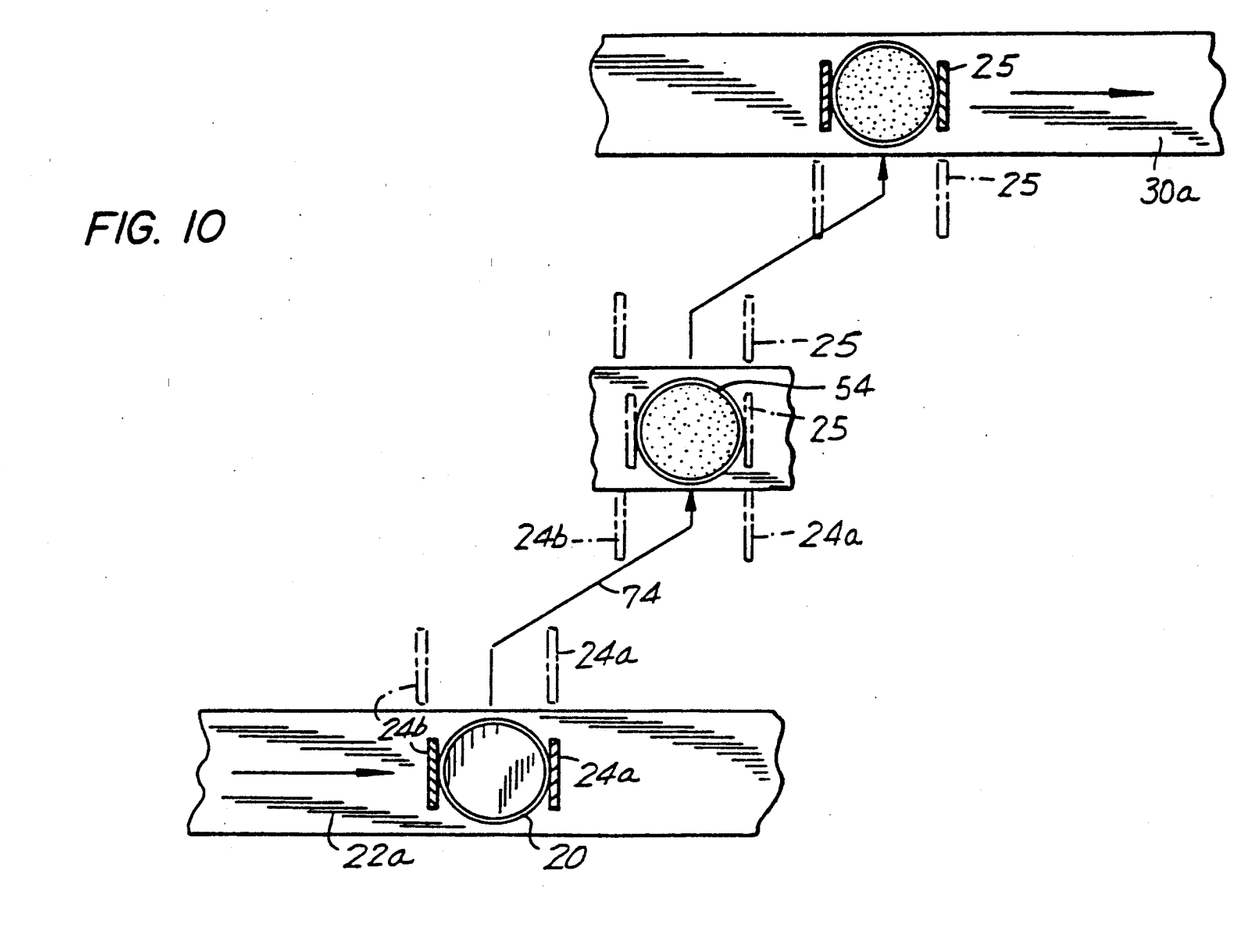
FIG. 10 schematically shows the cyclical movement of grippers transferring containers from an input conveyor to a weighing and filling station and then to a discharge conveyor.

The rotation and timing of rotation of each of the motors 44, 44a, 66 and 60 are controlled by the computer 55 programmed to provide the desired motions. The weighing mechanisms are likewise connected to the computer 55 to coordinate timing and movement. Thus, all movements in the machine are controlled by a program that may be selectively varied to customize the machine to different containers and feed materials. This eliminates and is superior to complex-fixed cams. FIG. 10 illustrates the movement or path of movement of the grippers that load and unload the weighing station. Beginning a cycle at the input conveyor 22a, the grippers 24 move in and grasp a container 20. The container 20 is one of a group (see FIG. 6), all of which are gripped and travel simultaneously by all grippers on the beam 48. The movement of a container 20 is indicated by the arrow 74 which tracks the center of container 20. The beam 48 sweeps in while the channel 56 slides with conveyor 22a. Pincer 24b closes on container 20 which is moved to station 54. It is there steadied by grippers 25 of the other beam 48a (see FIG. 6) which gently releases the container 20 a plurality of times for incremental weighing during filling. Gripper 25 then conveyor 30a. Channel 56 of the other beam 48a moves with conveyor 30a during deposition of a container 20 on conveyor 30a.

In one embodiment the grippers move at a velocity of thirty inches per second, while the subsequent incoming jar moves with the conveyor 22a at fifteen inches per second. It can be seen that this permits clearance for the next group of containers on conveyor 22a.

All these movements are programmed into the computer which controls the motors 44, 44a, 60 and 66.

Additionally, while my invention has been illustrated for filling containers with comminuted or fluid materials, it should be understood that it can be used for sorting by weight irregular objects and rejecting objects not meeting weight requirements. In such a case, the grippers could be activated to release nonconforming objects either on a different output conveyor or into a reject bin located adjacent the output conveyor 30a.

While mechanical gripping is shown in my preferred embodiment of the invention, it should also be understood that other gripping means such as electro-magnetic and vacuum grippers may be utilized. The programming of the grippers instead of operating a two-way motor 66, would operate a vacuum valve or a switch in the circuit of an electro-magnetic gripper.

Where it is desired to vibrate the containers during filling, the grippers can be programmed to release or partially release the container while the gripper itself and/or the platform 54 is vibrated. This is particularly useful when the material being fed into the containers is a comminuted material such as ground coffee, cocoa powder and the like. The application of vibration would be before or after weighings or during intervals in multiple weighings as is well-known in the art.

I do not wish to be limited to the precise arrangement of my preferred embodiments. For example, a bin could be remotely filled and weighed by a weight controlled material feeder and the bin then emptied into a container 20 held by the grippers or deposited and held on a vibrator, all within the spirit of my invention. Further, the stationary filling platform could be in line with the input conveyor beyond its terminus.

I claim:

1. A machine, comprising:
   an input conveyor capable of transporting containers;
   a group of stations displaced from said conveyor;
   a mechanism mounted for movement between said conveyor and said stations, said mechanism supporting means moveable there-along;
   a plurality of pairs of gripping devices, said devices being supported along said means;
   said gripping devices being spaced apart in a straight line along said movable means, said movable means moving said gripping devices along said line and said mechanism moving said movable means and said gripping devices at right angles to said line;
   differential drive means operatively connected to at least one of each pair of gripping devices whereby the movement of a downstream gripping device of each pair in the direction of movement of said conveyor is slower than the movement of an upstream gripping device of each pair with respect to the movement of said conveyor when said mechanism positions said gripping devices to grip a container moving on said conveyor;
   said differential drive means causing each of said pairs of gripping devices to dwell in a non-gripping position at said stations and then in a gripping position at said stations whereby containers at said stations may be held and released during an operation upon the containers while at said stations; and
   means for weighing the containers at said stations when said pairs of gripping devices are in said non-gripping position at said stations.

2. A container filling machine, comprising:
   an input conveyor capable of transporting containers in a substantially straight line;
   a stationary filling station;
   a material feeder adapted to feed material into a container at said filling station;
   means adapted to weigh material;
   means responsive to the weighing of said material to limit the feed from said material feeder;
   transport members constructed and arranged to grip a container on said conveyor to transport said container to said filling station;
   said transport members comprise first and second gripping members supported on a beam positioned parallel to said input conveyor;
   said beam being movably mounted to move between said input conveyor and said filling station;

first and second means slidably mounted along said beam, said first means supporting said first gripping member and said second means supporting said second gripping member;

said input conveyor transports said containers in an input direction;

said first gripping member being downstream of said second gripping member with respect to said input direction;

differential drive means for driving said gripping members relative to each other whereby said first gripping member moves slower than said second gripping member in said input direction when said beam positions said gripping members to grip a container moving on said input conveyor; and the resultant movement of said gripping members causing said gripping members to close upon said container in a scooping movement with respect to said input conveyor to gently lift and bring said container to a stationary position for deposition at said filing station, the path of said resulting movement of said container being a curve moving from said input conveyor to said filling station.

3. A plurality of mechanisms, each mechanism comprising:

a container filling machine, comprising:

an input conveyor capable of transporting containers in a substantially straight line;

a stationary filling station;

a material feeder adapted to feed material into a container at said filling station;

means adapted to weigh material;

means responsive to the weighing of said material to limit the feed from said material feeder; and transport members constructed and arranged to grip a container on said conveyor to transport said container to said filling station;

the plurality of mechanisms being further characterized by:

a plurality of input conveyors and a plurality of discharge conveyors;

each said plurality comprising at least one pair of parallel conveyors communicating with a single conveyor; and drive means for moving each said pair of parallel conveyors at a lesser velocity than the respective communicating single conveyor.

4. The plurality of mechanisms of claim 3, in which the transport members are electromagnetic.

5. The plurality of mechanisms of claim 3, in which the transport members are vacuum cups.

6. A container filling machine, comprising:

an input conveyor capable of transporting containers in a substantially straight procession;

a stationary filling platform having multiple filling stations linearly positioned and including weighing scales associated with said filling stations;

a plurality of material feeders adapted to feed material into containers positioned at said stations;

first gripping devices for gripping containers and movable between said input conveyor and said filling platform;

a discharge conveyor;

second gripping devices for gripping containers and movable between said filling platform and said discharge conveyor; and coordinating means for coordinating movement and operation of said gripping devices as follows:

(1) the first gripping devices release containers transported thereby at said filling stations at substantially the same time that said second gripping devices accelerate to move along said discharge conveyor;

(2) said first gripping devices track to dwell positions between said filling stations and said input conveyor, said second gripping devices moving along said discharge conveyor and accelerating to the speed of said discharge conveyor to deposit containers thereupon;

(3) said first gripping devices moving adjacent to said input conveyor, said second gripping devices tracking to said filling stations in a non-gripping mode with respect to containers thereon;

(4) said first gripping devices dwelling adjacent said input conveyor and said second gripping devices gripping containers at said filling stations;

(5) said first gripping devices accelerating along said input conveyor to the speed of said input conveyor and gripping containers thereon, said second gripping devices dwelling at said filling stations and releasing and regripping the containers at the filling stations; and (6) said first griping devices track to the filling stations while decelerating their motion parallel to said input conveyor at substantially the same tie that said second gripping devices move to said discharge conveyor and accelerate to the speed of said discharge conveyor to deposit containers thereupon.

7. The machine of claim 6, wherein:

the second gripping devices have a dwell in their movement while gripping containers at said filling stations; and further comprising vibratory means for vibrating the containers at said filling stations while held by said second gripping devices during their dwell.

8. A method of weighing and filling a plurality of containers, comprising the steps of:

guiding said containers in substantial linear procession at a predetermined velocity;

dividing said procession into a plurality of linear groups with each group moving along a different path of a plurality of spaced apart paths;

slowing said groups and moving the groups along their respective paths at a lesser velocity than said predetermined velocity;

spacing said containers in each group a predetermined linear distance in procession from each other;

positively engaging and gripping each of said spaced containers;

simultaneously transporting said spaced and gripped containers to a filling and weighing area;

filling and weighing said containers at said filling and weighing area, said containers each being filled to a predetermined weight;

gripping and removing each group of filled containers from said filling and weighing area; and transporting each said removed group in procession at a given velocity, each removed group moving along a different path, and then accelerating said removed groups to a selected higher velocity; and combining the accelerated removed groups into a substantial linear procession moving at said selected higher velocity.

9. The method of claim 8, including the steps of:
determining during filling the increasing weight of at least one of said spaced containers;
comparing said increasing weight against a predetermined standard weight; and
terminating said filling when said standard is reached.

10. A machine for filling and weighing containers, comprising:
a stationary filling and weighing platform having at least one weighing scale;
an input conveyor for conveying containers in an infeed direction to adjacent said platform;
a transfer mechanism for transferring the containers from said input conveyor to said platform;
said transfer mechanism comprising at least one gripping device for gripping one of said containers being conveyed by said input conveyor and releasing said one container at said weighing scale;
a first drive operatively connected to said gripping device to linearly move said gripping device in said infeed direction;
a second and independent drive operatively connected to said gripping device to independently linearly move said gripping device in a direction transverse to said infeed direction;
means for controlling said first and second drives to cause said gripping device to be moving in said infeed direction when said gripping device grips said one container on said input conveyor and to bring said one container to rest as said gripping device positions said one container at said weighing scale;
a filling head positioned to fill said one container when at said weighing scale;
a frame structure supporting said filling head and said transfer mechanism; and
said platform being supported separately from and sequestered from said frame structure and said input conveyor.

11. The machine of claim 10, further comprising a discharge conveyor, said platform being disposed between said input conveyor and said discharge conveyor.

12. The machine of claim 10, further comprising a computer which receives an input from said weighing scale and has an output for controlling said filling head.

13. A machine for filling and weighing containers, comprising:
a stationary filling and weighing platform having at least one weighing scale;
an input conveyor for conveying containers in an infeed direction to adjacent said platform;
a transfer mechanism for transferring the containers from said input conveyor to said platform;
said transfer mechanism comprising at least one gripping device for gripping one of said containers being conveyed by said input conveyor and releasing said one container at said weighing scale;
a first drive operatively connected to said gripping device to move said gripping device in said infeed direction;
a second drive operatively connected to said gripping device to independently move said gripping device in a direction transverse to said infeed direction;
means for controlling said first and second drives to cause said gripping device to be moving in said infeed direction when said gripping device grips said one container on said input conveyor and to bring said one container to rest as said gripping device releases said one container at said weighing scale;
a filling head positioned to fill said one container when at said weighing scale;
a frame structure supporting said filling head and said transfer mechanism;
said platform being supported separately from and sequestered from said frame structure and said input conveyor; and
said first drive comprising a first motor drivingly connected to said gripping device through a rack an pinion.

14. The machine of claim 13, wherein said second drive comprises a second motor drivingly connected to said gripping device through a jack screw which extends at right angles to said rack.

* * * * *